United States Patent
Kohda et al.

(10) Patent No.: US 10,594,601 B2
(45) Date of Patent: *Mar. 17, 2020

(54) PACKET BROADCASTING MECHANISM FOR MESH INTERCONNECTED MULTI-COMPUTERS

(71) Applicant: INTERNATIONAL BUSINESS MACHINES CORPORATION, Armonk, NY (US)

(72) Inventors: Yasuteru Kohda, Kawasaki (JP); Nobuyuki Ohba, Sendai (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,317

(22) Filed: Dec. 5, 2017

(65) Prior Publication Data

US 2018/0227228 A1    Aug. 9, 2018

Related U.S. Application Data

(63) Continuation of application No. 15/427,188, filed on Feb. 8, 2017.

(51) Int. Cl.
*H04L 12/721* (2013.01)
*H04L 29/08* (2006.01)
(Continued)

(52) U.S. Cl.
CPC .......... *H04L 45/44* (2013.01); *H04L 47/6275* (2013.01); *H04L 49/201* (2013.01); *H04L 49/254* (2013.01); *H04L 67/1002* (2013.01)

(58) Field of Classification Search
CPC ... H04L 45/44; H04L 47/6275; H04L 49/201; H04L 49/254; H04L 67/1002
See application file for complete search history.

(56) References Cited

U.S. PATENT DOCUMENTS

| 5,541,916 A | 7/1996 | Nobuyuki |
| 6,085,276 A | 7/2000 | VanDoren et al. |
| (Continued) | | |

FOREIGN PATENT DOCUMENTS

EP    1 078 498 B1    2/2001

OTHER PUBLICATIONS

List of IBM Patents or Patent Applications Treated as Related dated Dec. 5, 2017, 2 pages.

(Continued)

*Primary Examiner* — Hamza N Algibhah
*Assistant Examiner* — James Ross Hollister
(74) *Attorney, Agent, or Firm* — Tutunjian & Bitetto, P.C.; Vazken Alexanian

(57) ABSTRACT

A method is provided for packet broadcasting in a mesh-interconnected multi-computer network having a plurality of routers and a plurality of arbiters. The method includes interconnecting each of the plurality of routers to each of the plurality of arbiters. The method further includes receiving, by each of the plurality of arbiters, two or more packet broadcast requests. The method also includes live-lock free arbitering, by each of the plurality of arbiters, between the two or more packet broadcast requests using a shared priority matrix that selects one of the two or more packet broadcast requests. The shared priority matrix is shared amongst the plurality of arbiters and stores priority information relating to a correspondence between a plurality of packet broadcast requests, including the two or more packet broadcast requests, with respect to priorities assigned to each of the plurality of packet broadcast requests.

18 Claims, 15 Drawing Sheets

(51) Int. Cl.
*H04L 12/931* (2013.01)
*H04L 12/937* (2013.01)
*H04L 12/865* (2013.01)

(56) References Cited

U.S. PATENT DOCUMENTS

| | | | |
|---|---|---|---|
| 6,480,502 B1* | 11/2002 | Abadi | H04L 45/00 370/254 |
| 6,667,984 B1* | 12/2003 | Chao | H04Q 11/0478 370/414 |
| 7,397,762 B1 | 7/2008 | Firoiu et al. | |
| 7,543,060 B2 | 6/2009 | Ishida et al. | |
| 9,100,323 B1* | 8/2015 | Sindhu | H04L 45/16 |
| 2005/0188075 A1 | 8/2005 | Dias et al. | |
| 2006/0098604 A1 | 5/2006 | Flammer, III et al. | |
| 2007/0121630 A1* | 5/2007 | Stephen | H04L 49/201 370/390 |
| 2007/0299980 A1 | 12/2007 | Amini et al. | |
| 2008/0005392 A1 | 1/2008 | Amini et al. | |
| 2009/0138683 A1 | 5/2009 | Capps, Jr. et al. | |
| 2009/0313400 A1 | 12/2009 | Amini et al. | |
| 2010/0002716 A1* | 1/2010 | Naven | H04L 47/52 370/419 |
| 2010/0223379 A1 | 9/2010 | Tantawi et al. | |
| 2011/0208887 A1* | 8/2011 | Chen | G06F 13/362 710/241 |
| 2013/0031282 A1 | 1/2013 | Amini et al. | |
| 2013/0031562 A1* | 1/2013 | Gusak | G06F 9/505 718/105 |
| 2013/0268861 A1 | 10/2013 | Bailey et al. | |
| 2015/0139653 A1* | 5/2015 | Binkert | H04J 14/0256 398/79 |
| 2015/0169347 A1 | 6/2015 | Anand et al. | |
| 2015/0169350 A1 | 6/2015 | Anand et al. | |
| 2015/0188848 A1* | 7/2015 | Tran | H04L 49/254 370/390 |

OTHER PUBLICATIONS

Office Action for U.S. Appl. No. 15/357,688 dated Jun. 12, 2018.
Jeloka, S., et al., "Hi-Rise: A High-Radix Switch for 3D Integration with Single-Cycle Arbitration," 2014 47th Annual IEEE/ACM International Symposium on Microarchitecture, Dec. 13-17, 2014. (pp. 471-483).
Chen, K.F., et al., "Fast and noniterative scheduling in input-queued switches: Supporting QoS," Computer Communications, vol. 32, Issue 5, Mar. 27, 2009. (pp. 834-846).

\* cited by examiner

PACKET BROADCASTING MECHANISM FOR MESH INTERCONNECTED MULTI-COMPUTERS

BACKGROUND

Technical Field

The present invention relates generally to information processing and, in particular, to a packet broadcasting mechanism for mesh interconnected multi-computers.

Description of the Related Art

In machine intelligent systems, it is important to quickly deliver neural data to all nodes. Thus, there is a need for a communication mechanism for mesh interconnected multi-computers.

SUMMARY

According to an aspect of the present invention, a method is provided for packet broadcasting in a mesh-interconnected multi-computer network having a plurality of routers and a plurality of arbiters. The method includes interconnecting each of the plurality of routers to each of the plurality of arbiters. The method further includes receiving, by each of the plurality of arbiters, two or more packet broadcast requests. The method also includes live-lock free arbitering, by each of the plurality of arbiters, between the two or more packet broadcast requests using a shared priority matrix that selects one of the two or more packet broadcast requests. The shared priority matrix is shared amongst the plurality of arbiters and stores priority information relating to a correspondence between a plurality of packet broadcast requests, including the two or more packet broadcast requests, with respect to priorities assigned to each of the plurality of packet broadcast requests.

According to another aspect of the present invention, a computer program product is provided for packet broadcasting in a mesh-interconnected multi-computer network having a plurality of routers and a plurality of arbiters. The computer program product includes a non-transitory computer readable storage medium having program instructions embodied therewith. The program instructions are executable by a computer to cause the computer to perform a method. The method includes interconnecting each of the plurality of routers to each of the plurality of arbiters. The method further includes receiving, by each of the plurality of arbiters, two or more packet broadcast requests. The method also includes live-lock free arbitering, by each of the plurality of arbiters, between the two or more packet broadcast requests using a shared priority matrix that selects one of the two or more packet broadcast requests. The shared priority matrix is shared amongst the plurality of arbiters and stores priority information relating to a correspondence between a plurality of packet broadcast requests, including the two or more packet broadcast requests, with respect to priorities assigned to each of the plurality of packet broadcast requests.

According to yet another aspect of the present invention, a system is provided for packet broadcasting in a mesh-interconnected multi-computer network having a plurality of routers. The system includes a plurality of arbiters, interconnected to each of the plurality of routers. The plurality of arbiters are configured to receive two or more packet broadcast requests. The plurality of arbiters are further configured to live-lock free arbiter between the two or more packet broadcast requests using a shared priority matrix that selects one of the two or more packet broadcast requests. The shared priority matrix is shared amongst the plurality of arbiters and stores priority information relating to a correspondence between a plurality of packet broadcast requests, including the two or more packet broadcast requests, with respect to priorities assigned to each of the plurality of packet broadcast requests.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a packet broadcasting mechanism for mesh interconnected multi-computers.

In an embodiment, the present invention provides a packet communication mechanism capable of handling both broadcast packets and standard (i.e., non-broadcast) packets.

Various embodiments are described herein relating to the processing of a plurality of requests issued by a plurality of nodes in a mesh interconnected multi-computer environment. For the sake of illustration, it can be presumed that each request corresponds to a different node.

Figure 1:
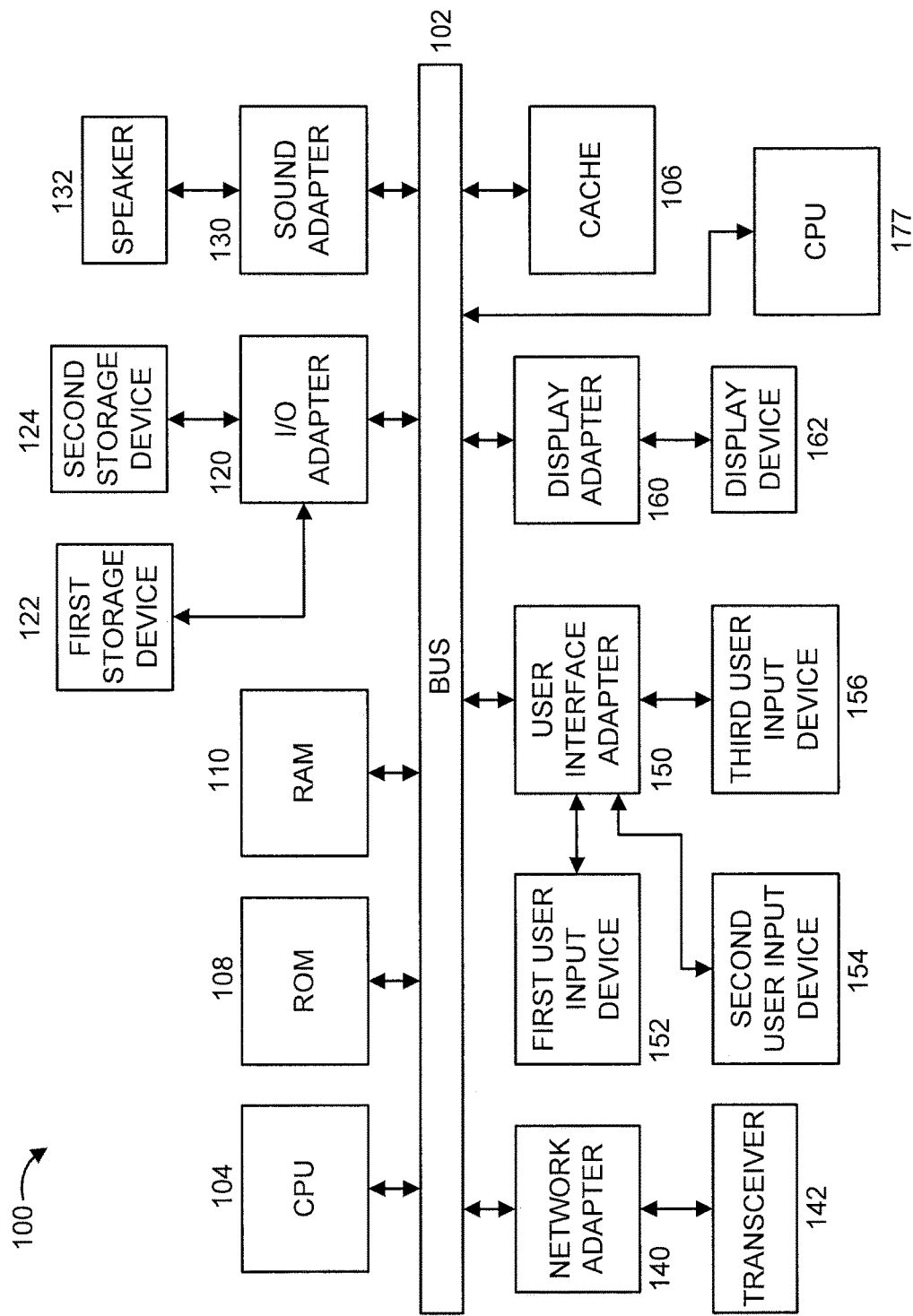
FIG. 1 is a diagram showing an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 can be included, for example, in any of the nodes shown and described with respect to, for example, FIG. 2.

The processing system 100 includes at least one processor (CPU) 104 and/or 177 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

A description will now be given regarding a packet broadcast, to which the present invention can be applied, in accordance with an embodiment of the present invention.

When a node received a broadcast packet, it duplicates the packet and sends the packets to multiple predefined output links.

Figure 2:
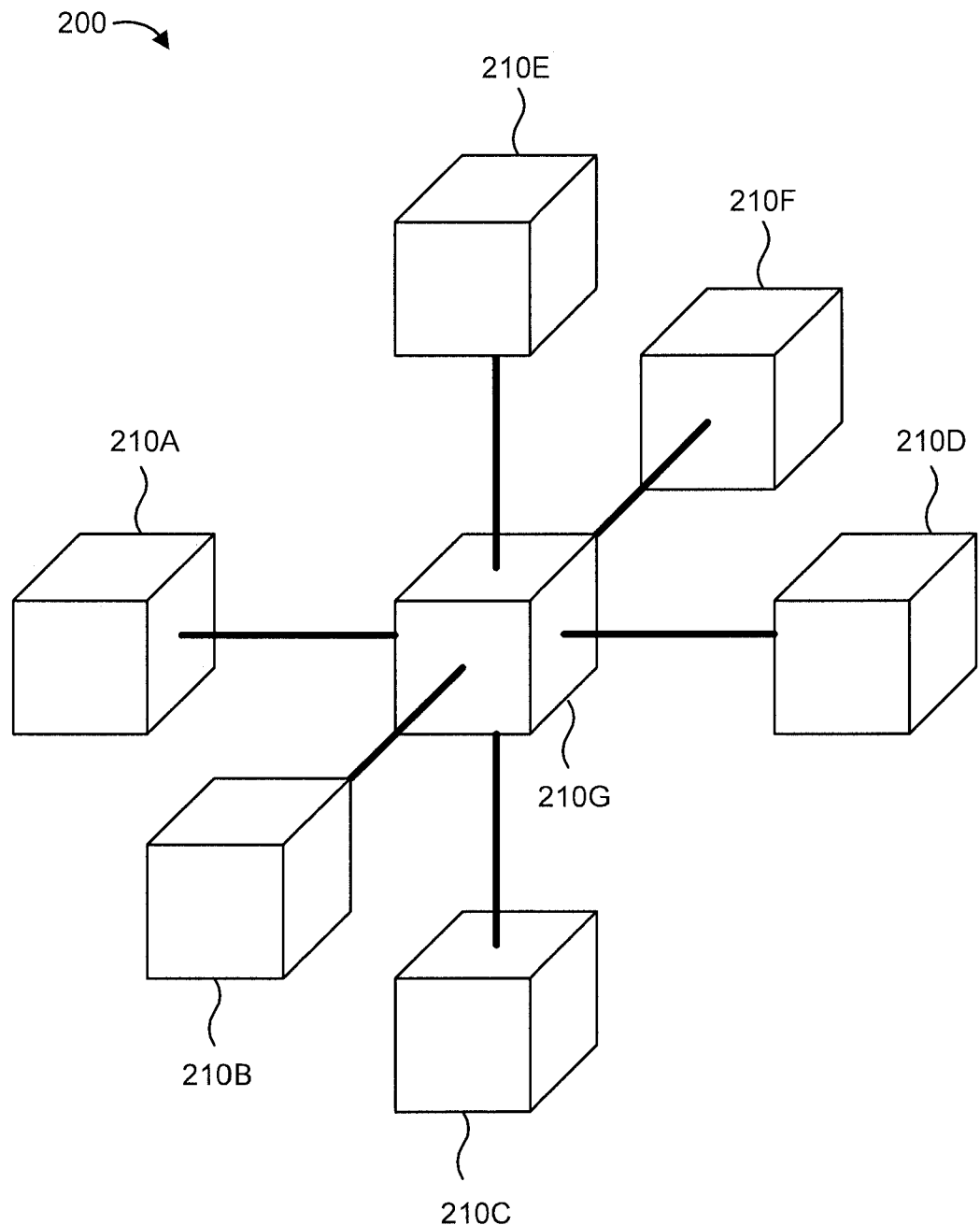
FIG. 2 is a diagram showing a part of an exemplary mesh-based network to which the present invention can be applied, in accordance with an embodiment of the present invention.

FIG. 2 shows a part of an exemplary mesh-based network 200 to which the present invention can be applied, in accordance with an embodiment of the present invention. The mesh-based network 200 may be formed by connecting a plurality of nodes 210. In FIG. 2, this part of the mesh-based network 200 is assumed to be formed by connecting nodes 210A, 210B, 210C, 210D, 210E, and 210F to a node 210G via links. Of course, other topologies can also be used, while maintaining the spirit of the present invention.

Figure 3:
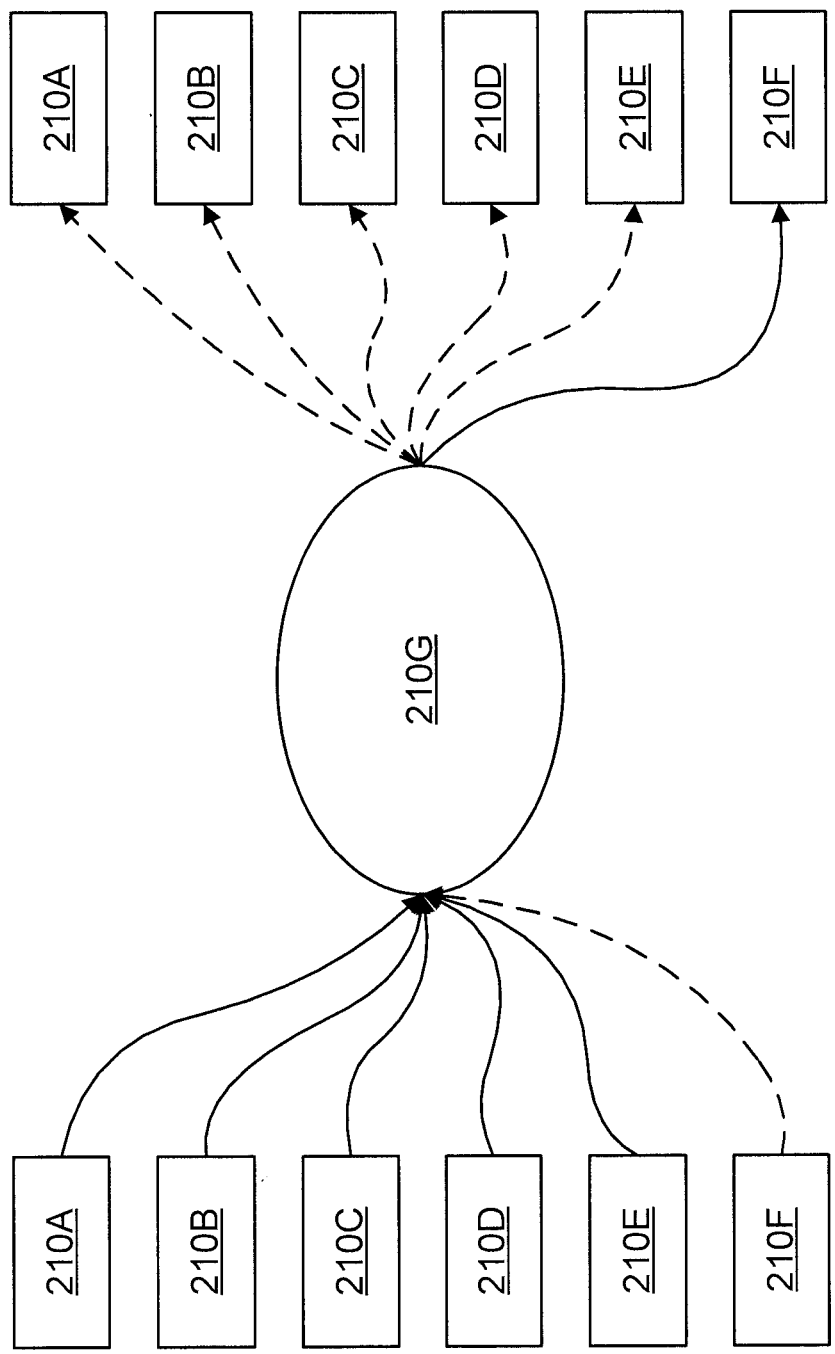
FIG. 3 is a diagram showing a representation in which each of several source nodes requests to send a packet to one destination node, in accordance with an embodiment of the present invention.

FIG. 3 shows a representation in which each of several source nodes requests to send a packet to one destination node, in accordance with an embodiment of the present invention. In FIG. 3, this part of the mesh-based network is assumed to cause a situation in which each of the nodes 210A, 210B, 210C, 210D, and 210E requests to send a packet to node 210F via node 210G. In this case, node 210G (in particular, a router in node 210G) may select one of the nodes 210A, 210B, 210C, 210D, and 210E, and forward the packet from the selected node to the node 210F. Note that, in some cases, the node 210F may send a packet and any of the nodes 210A, 210B, 210C, 210D, and 210E may receive the packet as indicated by broken lines in FIG. 3.

Figure 4:
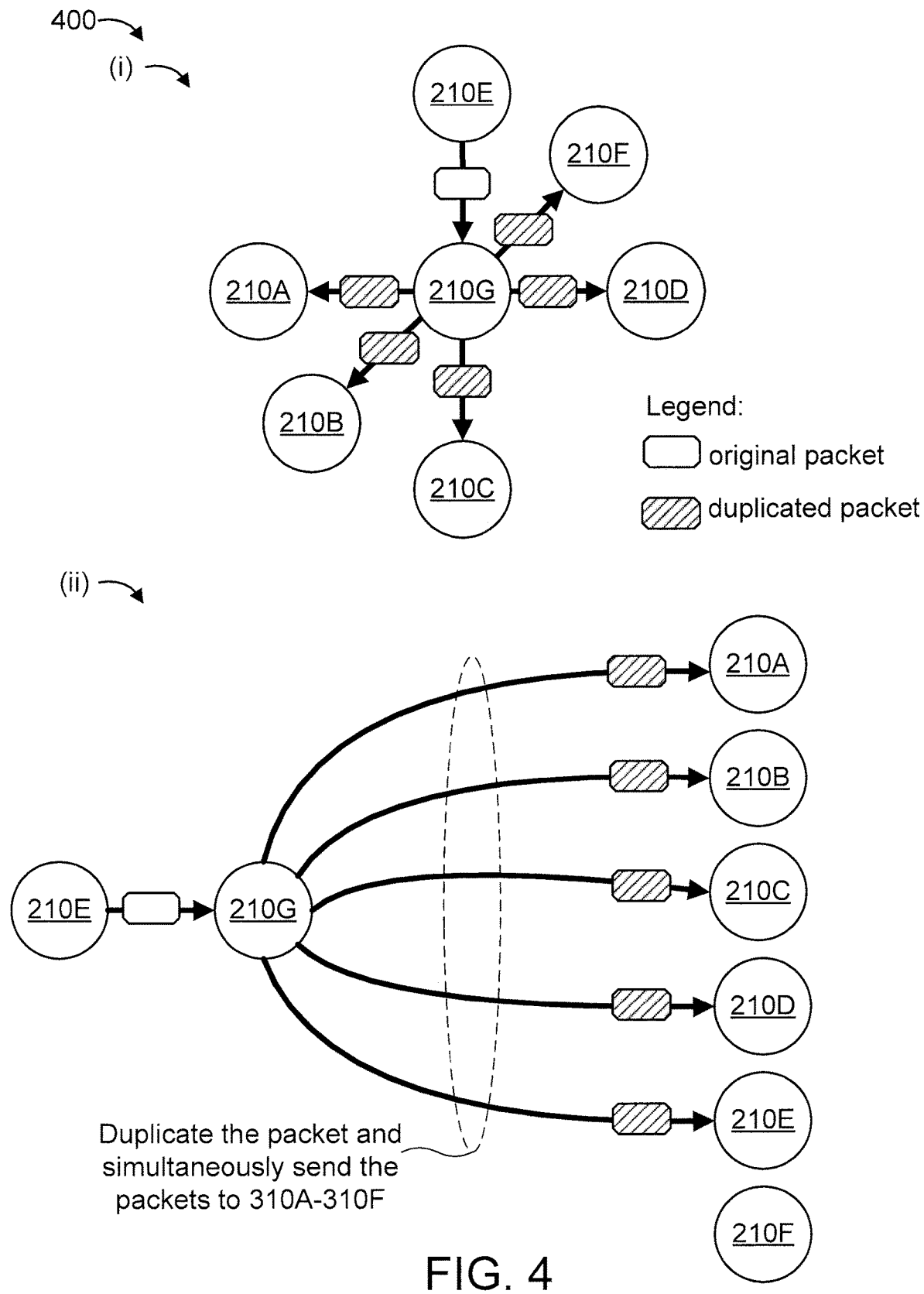
FIG. 4 is a diagram showing an exemplary packet broadcast to which the present invention can be applied, in accordance with an embodiment of the present invention.

FIG. 4 shows an exemplary packet broadcast 400 to which the present invention can be applied, in accordance with an embodiment of the present invention. In the exemplary packet broadcast 400, (i) Node E sends a broadcast packet to Node G; and (ii) Node G duplicates the packet and sends the packets to Nodes A, B, C, D and F in parallel. The packet broadcast 400 does not sequentially send packets to Node A, then B, then C, and so forth.

This parallel transfer lowers the latency and improves the throughput, but needs to acquire usage permission of all the output links. It is to be noted that not only Node E may attempt to send packets at that time. For example, if Node F attempts to broadcast packets to Nodes A, B, C, D, E and G, contention will occur at the links to Nodes A, B, C and D.

The system must properly handle not only broadcast packets but also standard non-broadcast packets.

Figure 5:
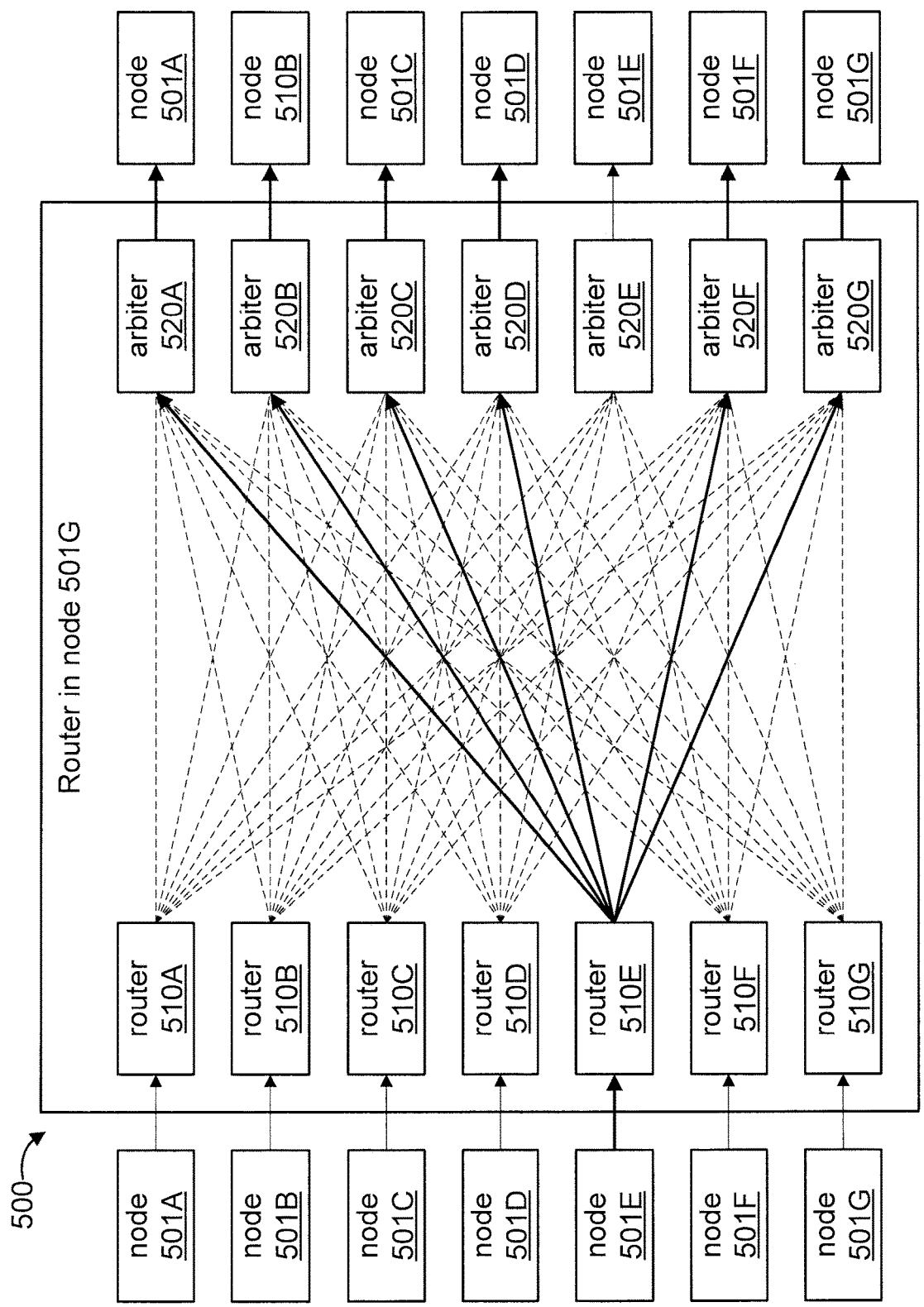
FIG. 5 is a diagram showing an exemplary broadcast capable router to which the present invention can be applied, in accordance with an embodiment of the present invention.

FIG. 5 shows an exemplary broadcast capable router 500 to which the present invention can be applied, in accordance with an embodiment of the present invention.

The exemplary broadcast capable router 500 includes nodes 501A-501G, routers 510A-510G, and arbiters 520A-520G.

Routers 510A through 510G respectively receive communications from nodes 501A through 501G, and route the communications to arbiters 520A-520G. The communications are then routed to applicable ones of the nodes 501A-501G depending upon arbitration results.

Router 510E sends a request to arbiters 520A, 520B, 520C, 520D, 520F and 520G, and waits for a grant from all of them. To send the packets, router 510E needs to win at arbiters 520A, 520B, 520C, 520D, 520F and 520G.

The packet broadcast mechanism in this invention forwards the packet only when router 510E receives a grant from the arbiters of all destinations.

The present invention addresses the router 500, which issues requests to two or more target arbiters, and receives grants from them. If the router receives grants from all of the target arbiters, it sends packets to the output links in parallel. Thus, the present addresses a first problem of live lock and a second problem of unfair arbitration.

A description will now be given of the live lock problem solved by the present invention.

When two or more routers issue broadcast requests at the same time, live lock can happen.

Figure 6:
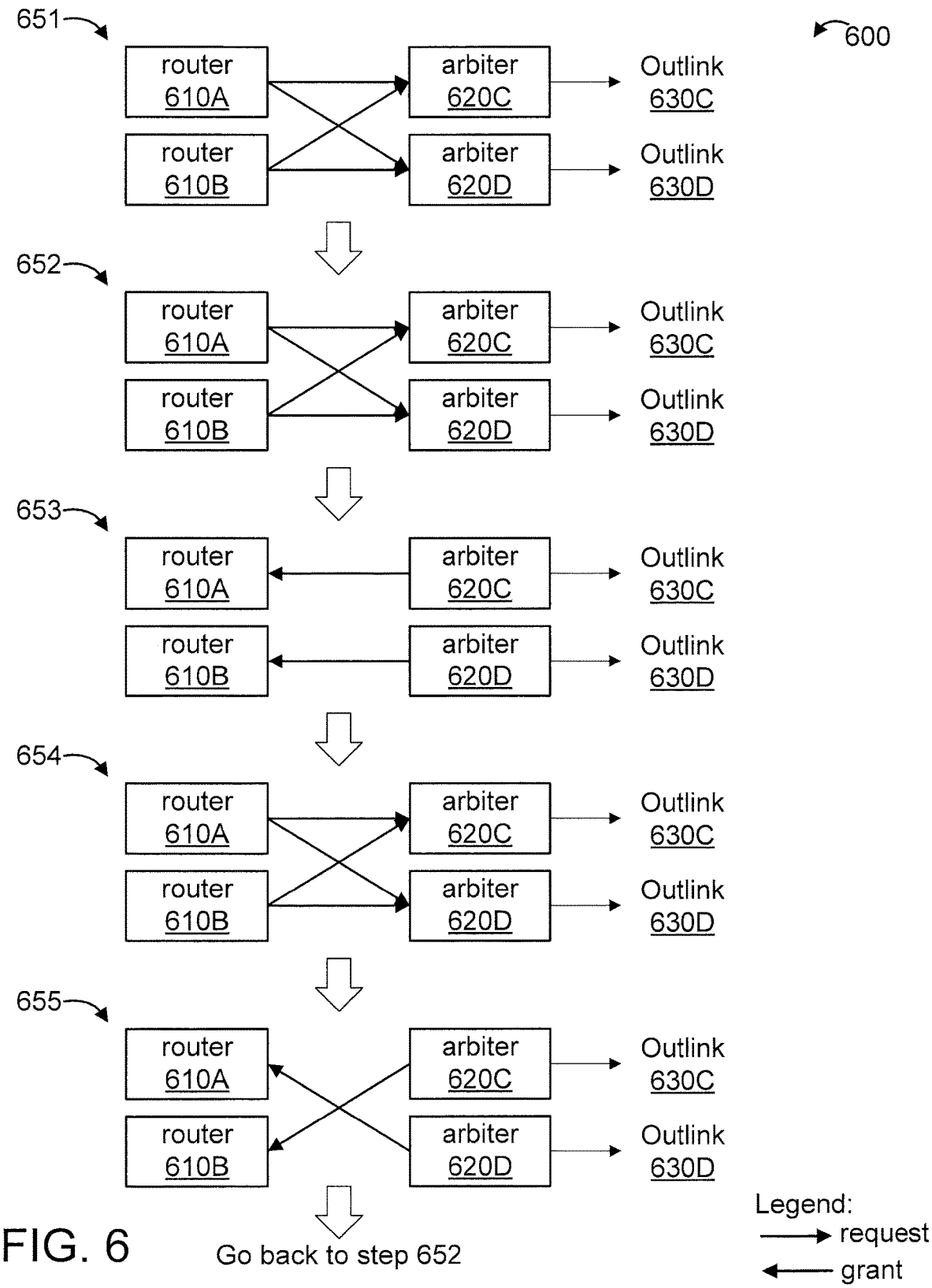
FIG. 6 is a diagram showing exemplary steps for issuing concurrent broadcast requests that result in a live lock condition to which the present invention can be applied, in accordance with an embodiment of the present invention.

FIG. 6 shows exemplary steps 600 for issuing concurrent broadcast requests that result in a live lock condition to which the present invention can be applied, in accordance with an embodiment of the present invention. The concurrent broadcast requests are issued by two or more routers. In the example of FIG. 6, the concurrent broadcast requests are issued by routers 610A and 610B and processed by arbiters 620C and 620D for outlinks 630C and 630D. The steps 600 involve requests and grants, with the requests represented by arrows going from left to right, and with the grants represented by arrows going from right to left.

The steps 600 includes steps 651 through 655.

At step 651, routers 610A and 610B attempt to broadcast a packet to outlinks 630C and 630D.

At step 652, routers 610A and 610B simultaneously issue requests to arbiters 620C and 620D, and wait for a grant from arbiters 620C and 620D.

At step 653, arbiter 620C returns a grant to router 610A, while arbiter 620D returns a grant to router 610B.

At step 654, routers 610A and 610B again simultaneously issue requests to arbiters 620C and 620D, and wait for a grant from arbiters 620C and 620D.

At step 655, arbiter 620C returns a grant to router 610B, while arbiter 620D returns a grant to router 610A.

A description will now be given of the unfair arbitration problem solved by the present invention.

A standard (non-broadcast) packet acquires one output link. A broadcast packet, on the other hand, has to acquire multiple output links at a time.

When a standard packet and a broadcast packet compete, the standard packet is more likely to acquire the output link.

Figure 7:
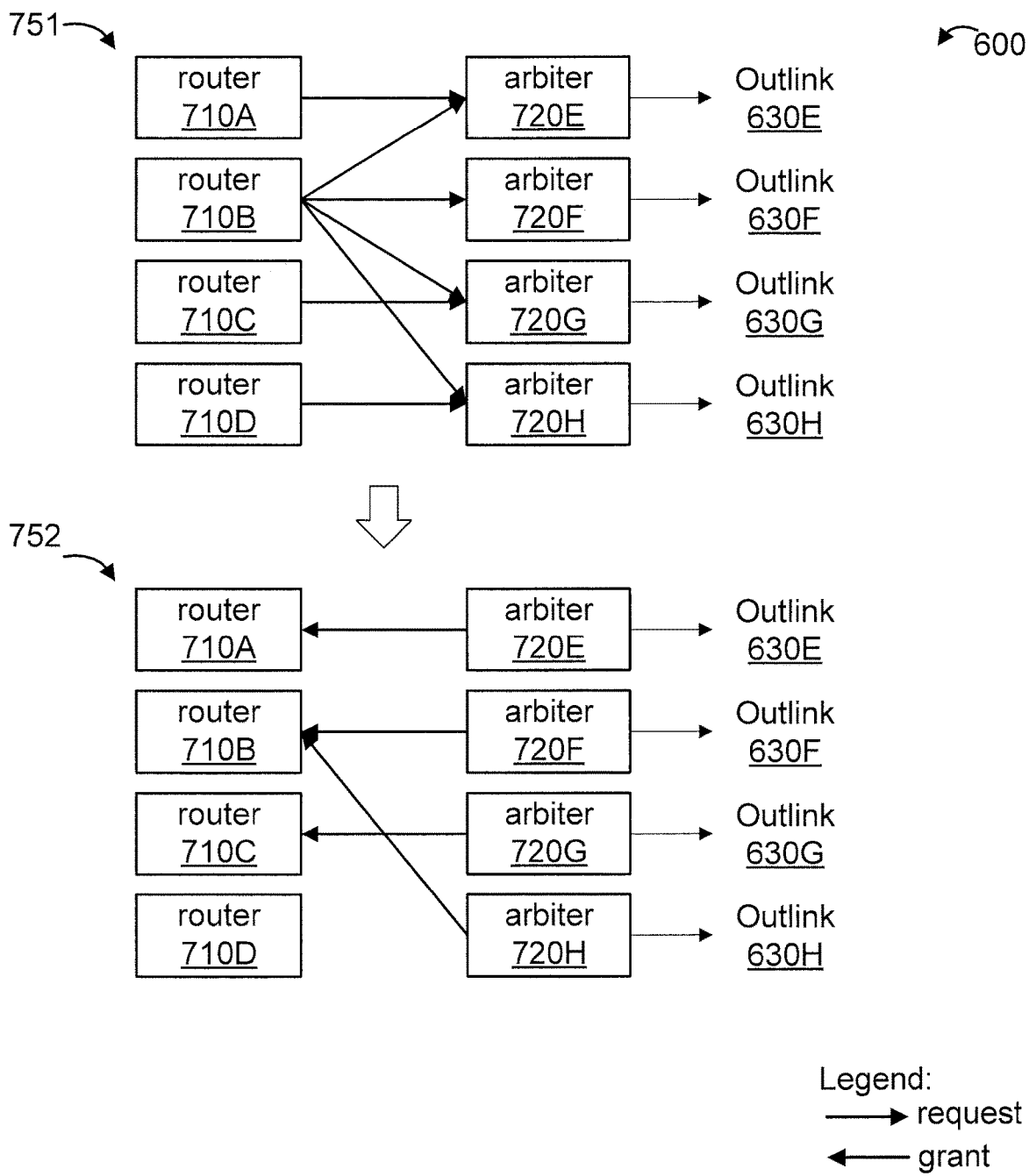
FIG. 7 is a diagram showing exemplary steps for issuing concurrent standard broadcast requests that result in an unfair arbitration condition to which the present invention can be applied, in accordance with an embodiment of the present invention.

FIG. 7 shows exemplary steps 700 for issuing concurrent standard broadcast requests that result in an unfair arbitration condition to which the present invention can be applied, in accordance with an embodiment of the present invention. The concurrent standard and broadcast requests are issued by two or more routers. In the example of FIG. 7, the concurrent requests are issued by routers 710A through 710D and processed by arbiters 720E through 720H for outlinks 730E through 730H. The steps 700 involve requests and grants, with the requests represented by arrows going from left to right, and with the grants represented by arrows going from right to left.

The steps 700 includes steps 751 through 752.

At step 751, router 710B attempts to broadcast packets to all outlinks (outlinks 730E through 730H). Routers 710A, 710C, and 710D attempt to send standard packets to outlinks E, G and H, respectively.

At step 752, router 710A receives a grant from arbiter 720E. Router 710C receives a grant from arbiter 720G. Therefore, they are allowed to send a packet to outlinks 730E and 730G. Although router 710B receives grants from arbiters 720F and 720H, it cannot broadcast packets as it does not receive grants from arbiters 720E or 720G.

Let N be the number of routers. Assume that one of the routers attempts to send broadcast packets to all N outlinks, and the remaining N−1 routers attempt to send standard non-broadcast packets to different N outlinks (there is no contention between the routers who attempt to send a standard packet). The router attempting to send a standard packet will win at probability ½. On the other hand, the router attempting to send broadcast packets will win at probability $(½)^{N-1}$.

A description will now be given regarding a shared priority matrix for live-lock free arbitration, in accordance with an embodiment of the present invention.

All arbiters share an identical priority matrix.

A broadcast packet, which sends requests to two or more arbiters, can win within N arbitration rounds.

Figure 8:
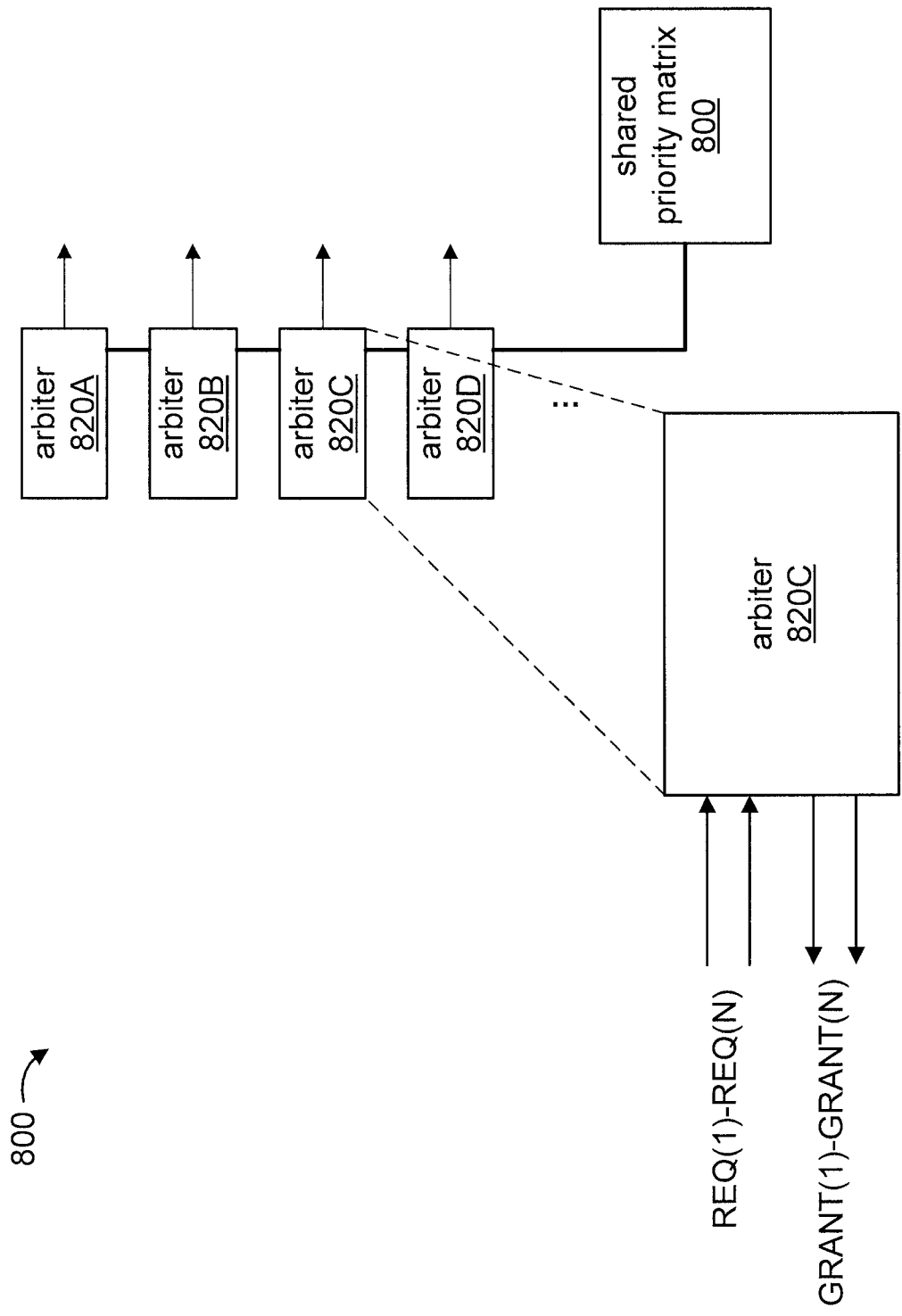
FIG. 8 is a diagram showing an exemplary shared priority matrix for live-lock free arbitration, in accordance with an embodiment of the present invention.

FIG. 8 shows an exemplary shared priority matrix 800 for live-lock free arbitration, in accordance with an embodiment of the present invention.

The shared priority matrix 800 is operatively coupled to a set of arbiters 820. In the example of FIG. 8, the set of arbiters 800 includes arbiters 820A through 820D, although any number of arbiters can be used, while maintaining the spirit of the present invention.

Any of the arbiters 820A through 820D can process the following signals as shown in TABLE 1 (and also in FIG. 8 relative to arbiter 820C):

TABLE 1

| Signal | Input/output | Definition |
| --- | --- | --- |
| REQ(1)-REQ(N) | Input | Request signal |
| GRANT(1)-GRANT(N) | Output | Grant signal to the requester. Only one of the grants is returned active |

Figure 9:
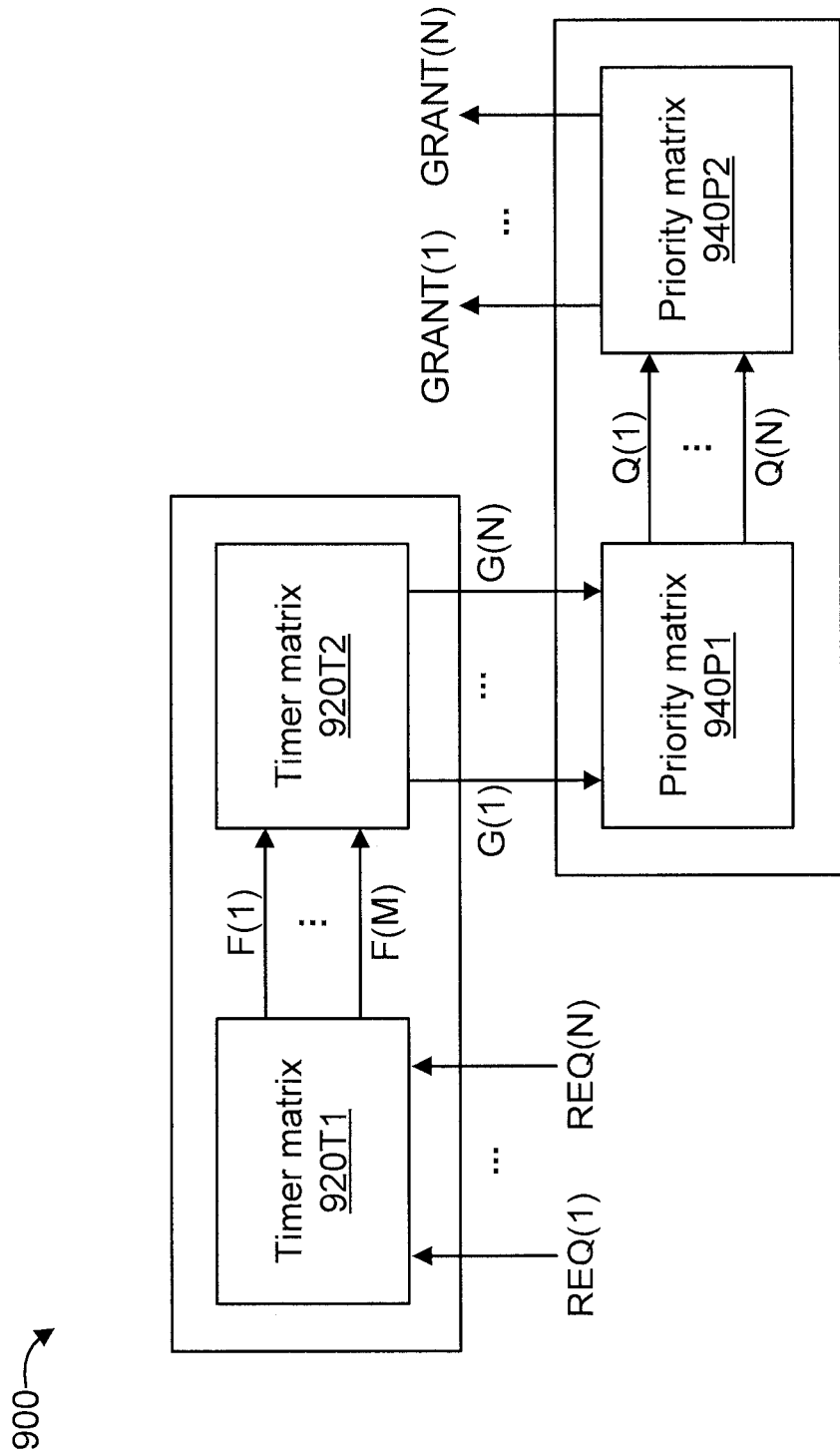
FIG. 9 is a diagram showing an exemplary arbiter implementation, in accordance with an embodiment of the present invention.

FIG. 9 shows an exemplary arbiter implementation 900, in accordance with an embodiment of the present invention.

The arbiter implementation 900 involves an arbiter 920 and a shared priority matrix 940.

The arbiter 920 includes a first timer matrix 920T1 and a second timer matrix 920T2. The first timer matrix 920T1 receives requests (i.e., requests REQ(1) through REQ(N)), and outputs signals (i.e., signals F(1) through F(M)). The second timer matrix 920T2 receives the signals (i.e., signals F(1) through F(M)), and outputs grants (i.e., grants G(1) through G(N)).

The shared priority matrix 940 includes a first priority matrix 940P1 and a second priority matrix 940P2. The first priority matrix 940P1 receives grants (i.e., grants G(1) through G(N)), and outputs signals (i.e., signals Q(1) through Q(N)). Note that all the arbiters in the router share the exactly same priority matrixes, 940P1 and 940P2. A requester can receive grant at least once in N arbitration rounds, because it can have the highest priority once in N arbitration rounds.

The arbiter 920 gives priority to long-waiting requesters. The shared priority matrix 940 selects one of the requests and sends a grant in response to the request.

A further description will now be given of a timer matrix, in accordance with an embodiment of the present invention.

Figure 10:
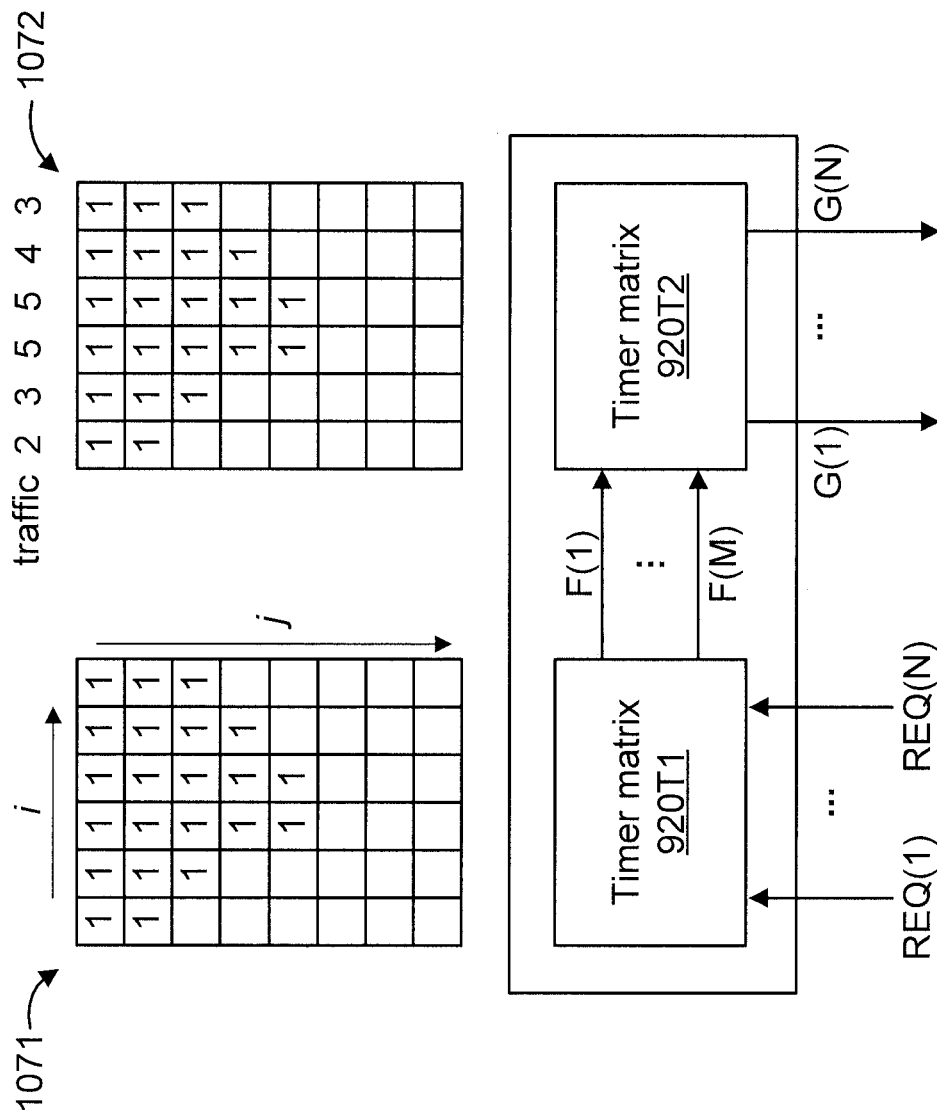
FIG. 10 is a diagram further showing the first timer matrix and the second timer matrix of the arbiter of FIG. 9, in accordance with an embodiment of the present invention.

FIG. 10 further shows the first timer matrix 920T1 and the second timer matrix 920T2 of the arbiter 920 of FIG. 9, in accordance with an embodiment of the present invention.

The timer matrixes 920T1 and 920T2 (of arbiter 920) select the input links that wait for the longest time.

Assuming that the timer matrix 920T1 (920T2) is denoted by T(i,j), the timer matrix may be obtained, for example, by the following formula:

$$T(i, j), 1 \leq i \leq N, 1 \leq j \leq M,$$

$$T(i, j) = \begin{cases} 1 & \text{if } j \leq \text{waiting time} \\ 0 & \text{otherwise} \end{cases}$$

where i represents a request index, and j represents a waiting time.

FIG. 10 also shows the respective matrix contents 1071 and 1072 for timer matrixes 920T1 and 920T2. The number of ones in a column of the contents 1071 or 1072 is increased by one when the requester loses the arbitration. In the matrix contents 1071 and 1072, N is assumed to be 6, and M is assumed to be 8. Further, the number of "1"s in the ith column from the left may represent a timer value of the request # i. For example, timer values of the request #1, #2, #3, #4, #5, and #6 are "2", "3", "5", "5", "4", and "3", respectively.

Next, an explanation is given about operations of the timer matrixes 920T1 and 920T2.

The timer matrix 920T1 (920T2) may first generate a signal F(j), for example, by the following formula:

$$F(j) = \cup_{i=1}^{N} REQ(i) \cdot T(i,j), \text{ where } \cup \text{ is a logical OR}$$

By this calculation, it may be possible for the signals F(1) to F(M) to indicate, as a whole, the largest timer value. Assuming that all of the signals REQ(1) to REQ(N) are set to "1" and the timer matrix T(I,j) shown in the figure is used, the signals F(1), F(2), F(3), F(4), F(5), F(6), F(7), and F(8) may be set to "1", "1", "1", "1", "1", "0", "0", and "0", respectively. This may indicate that the largest time value is "5", which is the number of consecutive "1"s from F(1).

The timer matrix 920T1 (920T2) may subsequently generate a signal G(i), for example, by the following formula:

$$G(i) = \prod_{j=1}^{M} \overline{F(j) \oplus T(i, j)},$$

where $\prod$ is logical AND and $\oplus$ is XOR

By this calculation, it may be possible for the signals G(1) to G(N) to indicate, as a whole, a least one longest waiting request. Since the signals F(1) to F(5) are set to "1" and the signals F(6) to F(8) are set to "0", assuming that the timer matrix T(I,j) shown in the figure is used, the signals G(1), G(2), G(3), G(4), G(5), and G(6) may be set to "0", "0", "1", "1", "0", and "0", respectively. This may indicate that the at least one longest waiting request is requests #3 and #4, whose indexes correspond to the longest waiting value.

As the matrix contents 1071 and 1072 suggest, the contents of the timer matrixes 920T1 and 920T2 are always the same. Thus, the timer matrixes 920T1 and 920T2 may be generated by duplicating one traffic matrix.

Figure 11:
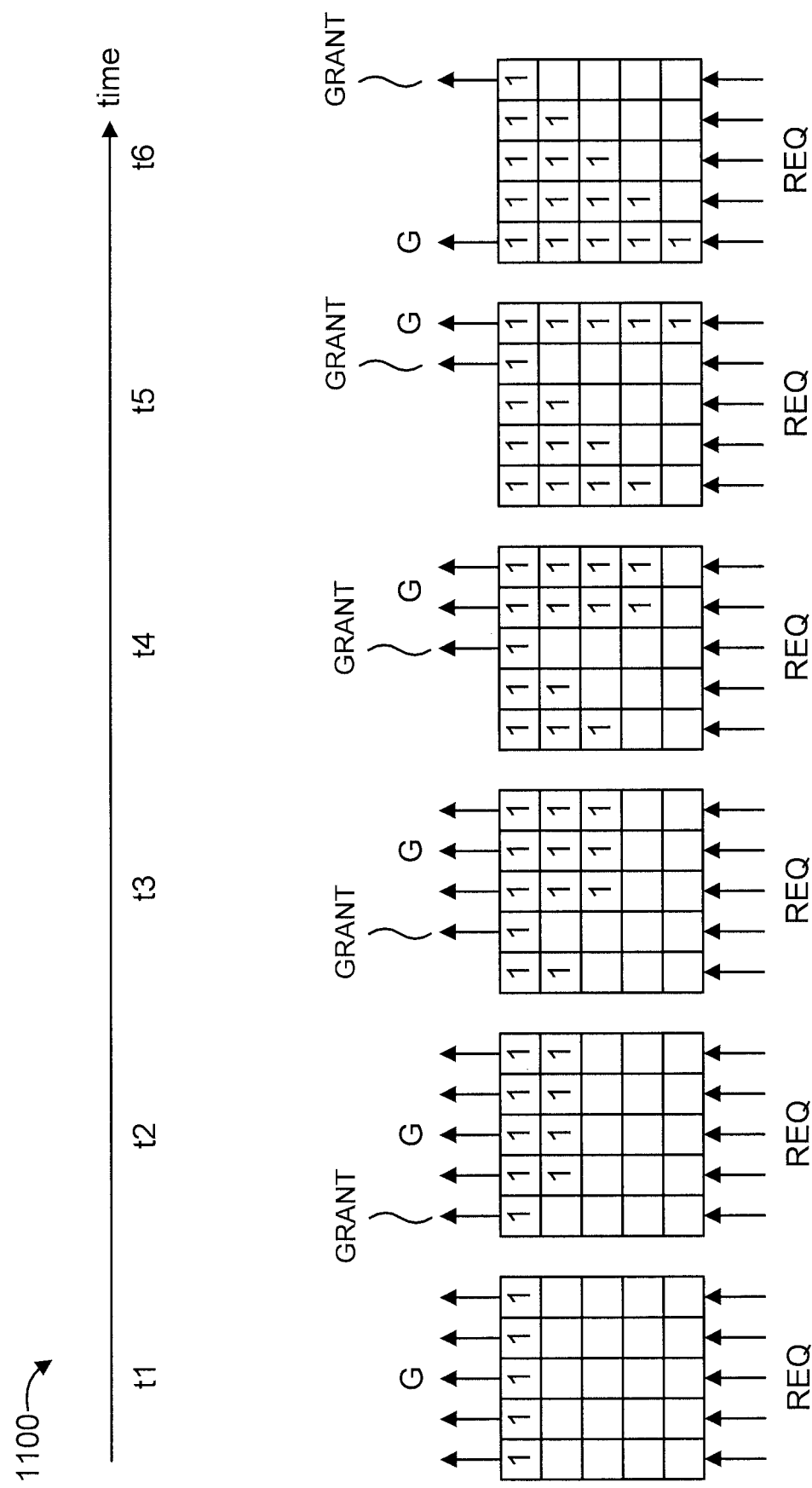
FIG. 11 is a diagram showing an operational example of timer matrix operation, in accordance with an embodiment of the present invention.

FIG. 11 shows an operational example 1100 of timer matrix operation, in accordance with an embodiment of the present invention. In particular, FIG. 11 shows the timer matrix at times t1 through t6, in accordance with an embodiment of the present invention. In FIG. 11, "REQ" denotes a request, "G" denotes no grant received, and "GRANT" denotes that a grant has been received.

At time t1, multiple requests are active, and no grant has been received for any of the multiple requests.

At time t2, a GRANT is received for one of the requests (the leftmost request). Accordingly, the number of 1's increments if REQ is active and (G) no grant has been received, and is reset to one when a GRANT is received. Thus, the number of 1's in each column except for the leftmost column is incremented, while the leftmost column is reset to include only one 1 therein.

At time t3, a GRANT is received for another one of the requests (the $2^{nd}$ to leftmost request). Accordingly, the number of 1's increments if REQ is active and (G) no grant has been received, and is reset to one when a GRANT is received. Thus, the number of 1's in each column except the $2^{nd}$ leftmost column is incremented, while the $2^{nd}$ leftmost column is reset to include one 1 therein.

At time t4, a GRANT is received for another one of the requests (the $3^{rd}$ to leftmost request). Accordingly, the number of 1's increments if REQ is active and (G) no grant has been received, and is reset to one when a GRANT is received. Thus, the number of 1's in each column except the $3^{rd}$ leftmost column is incremented, while the $3^{rd}$ leftmost column is reset to include one 1 therein.

At time t5, a GRANT is received for another one of the requests (the $4^{th}$ to leftmost request). Accordingly, the number of 1's increments if REQ is active and (G) no grant has been received, and is reset to one when a GRANT is received. Thus, the number of 1's in each column except the $4^{th}$ leftmost column is incremented, while the $4^{th}$ leftmost column is reset to include one 1 therein.

At time t6, a GRANT is received for another one of the requests (the $5^{th}$ to leftmost request). Accordingly, the number of 1's increments if REQ is active and (G) no grant has been received, and is reset to one when a GRANT is received. Thus, the number of 1's in each column except the $5^{th}$ leftmost column is incremented, while the $5^{th}$ leftmost column is reset to include one 1 therein.

A further description will now be given of a priority matrix, in accordance with an embodiment of the present invention.

Figure 12:
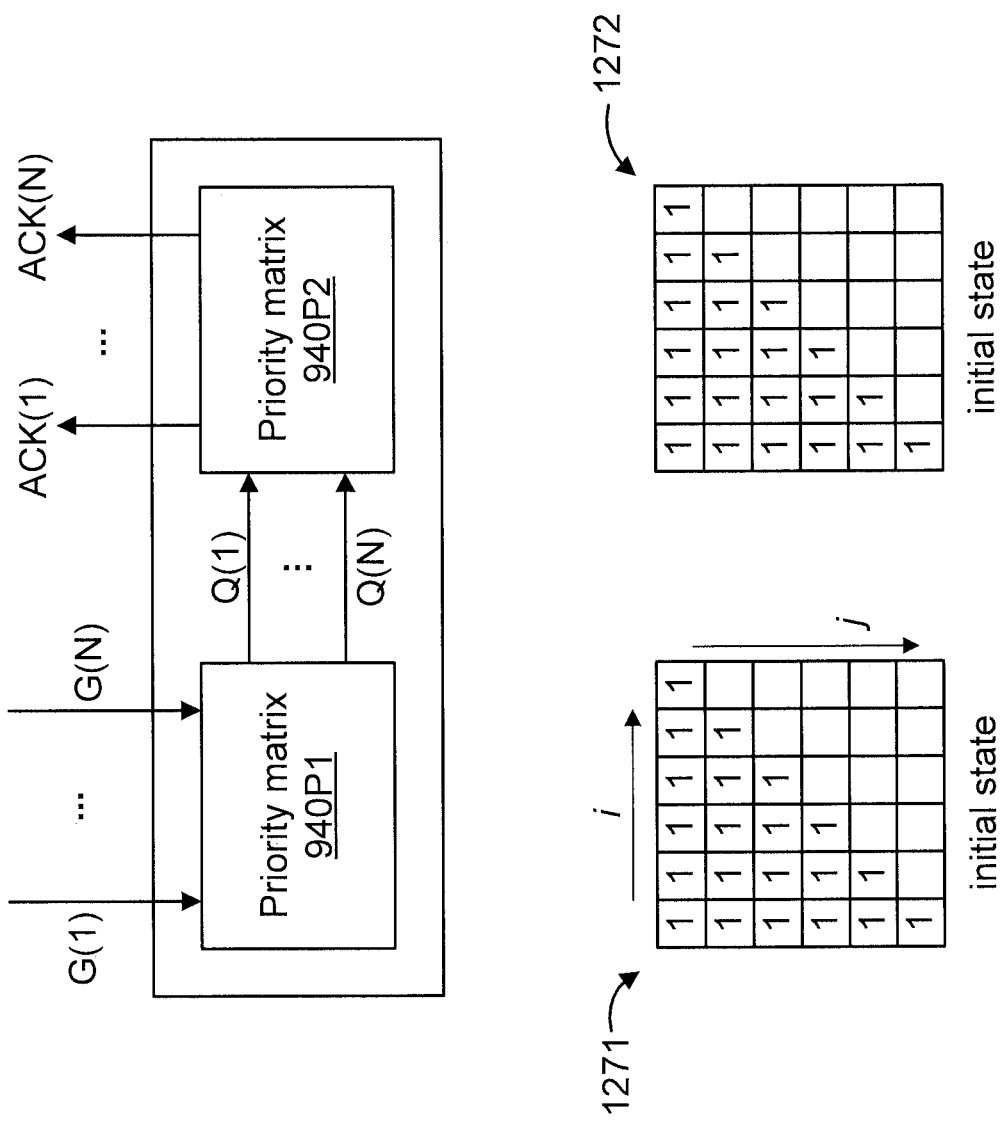
FIG. 12 is a diagram further showing the first priority matrix and the second priority matrix of the shared priority matrix of FIG. 9, in accordance with an embodiment of the present invention.

FIG. 12 further shows the first priority matrix 940P1 and the second priority matrix 940P2 of the shared priority matrix 940 of FIG. 9, in accordance with an embodiment of the present invention.

The priority matrixes 940P1 and 940P2 may select one of the request links.

FIG. 12 further shows matrix contents 1271 and 1272 which are examples of contents of the priority matrixes 940P1 and 940P2, respectively. As the matrix contents 1271 and 1272 suggest, the contents of the priority matrixes 940P1 and 940P2 are always the same. Thus, the priority matrixes 940P1 and 940P2 may be generated by duplicating one priority matrix. Note that the priority matrix 940P1 (940P2) serves as one example of priority information.

Assuming that the priority matrix 940P1 (940P2) is denoted by P(i,j), an initial state of the priority matrix P(i,j) may be obtained, for example, by the following formula:

$$1 \leq i \leq N, 1 \leq j \leq M,$$

$$\text{Initial state of } P(i, j) = \begin{cases} 1 & \text{if } (i + j) \leq (N + 1) \\ 0 & \text{otherwise} \end{cases}$$

where i represents a request index, and j represents a priority.

Note that i may represent an index indicating a request, and j may represent an index indicating a priority value. Further, the initial state of the priority matrix P(i,j) may represent a state before time transition of the priority matrix P(i,j) described later.

Also in the matrix contents 1271 and 1272, N is assumed to be 6. Further, the number of "1"s in the ith column from the left may represent a priority value of the node # i. For example, priority values of the node #1, #2, #3, #4, #5, and #6 are "6", "5", "4", "3", "2", and "1", respectively.

Next, an explanation is given about operations of the priority matrixes 940P1 and 940P2.

The priority matrix 940P1 (940P2) may first generate a signal Q(j), for example, by the following formula:

$$Q(j) = \cup_{i=1}^{N} G(i) \cdot P(i,j), \text{ where } \cup \text{ is a logical OR}$$

By this calculation, it may be possible for the signals Q(1) to Q(N) to indicate, as a whole, the largest priority value among priority values of the at least one longest waiting request. Since the signals G(1) and G(2) are set to "0", the signals G(3) and G(4) are set to "1", and the signals G(5) and G(6) are set to "0", assuming that the priority matrix P(i,j) shown in the figure is used, the signals Q(1), Q(2), Q(3), Q(4), Q(5), and Q(6) may be set to "1", "1", "1", "1", "0", and "0", respectively. This may indicate that the largest priority value among priority values of the nodes #3 and #4 is "4", which is the number of consecutive "1"s from Q(1).

The priority matrix 940P1 (940P2) may subsequently generate a signal ACK(i), for example, by the following formula:

$$ACK(i) = \prod_{j=1}^{M} \overline{Q(j) \oplus P(i, j)},$$

where $\prod$ is logical AND and $\oplus$ is XOR

By this calculation, it may be possible for the signals ACK(1) to ACK(N) to indicate, as a whole, one request having the largest priority value. Since the signals Q(1) to Q(4) are set to "1" and the signals Q(5) to Q(6) are set to "0", assuming that the priority matrix P(i,j) shown in the figure is used, the signals ACK(1), ACK(2), ACK(3), ACK(4), ACK(5), and ACK(6) may be set to "0", "0", "1", "0", "0", and "0", respectively. This may indicate that one request having the largest priority value among the at least one longest waiting requests is request #3, whose index corresponds to the largest priority value.

Figure 13:
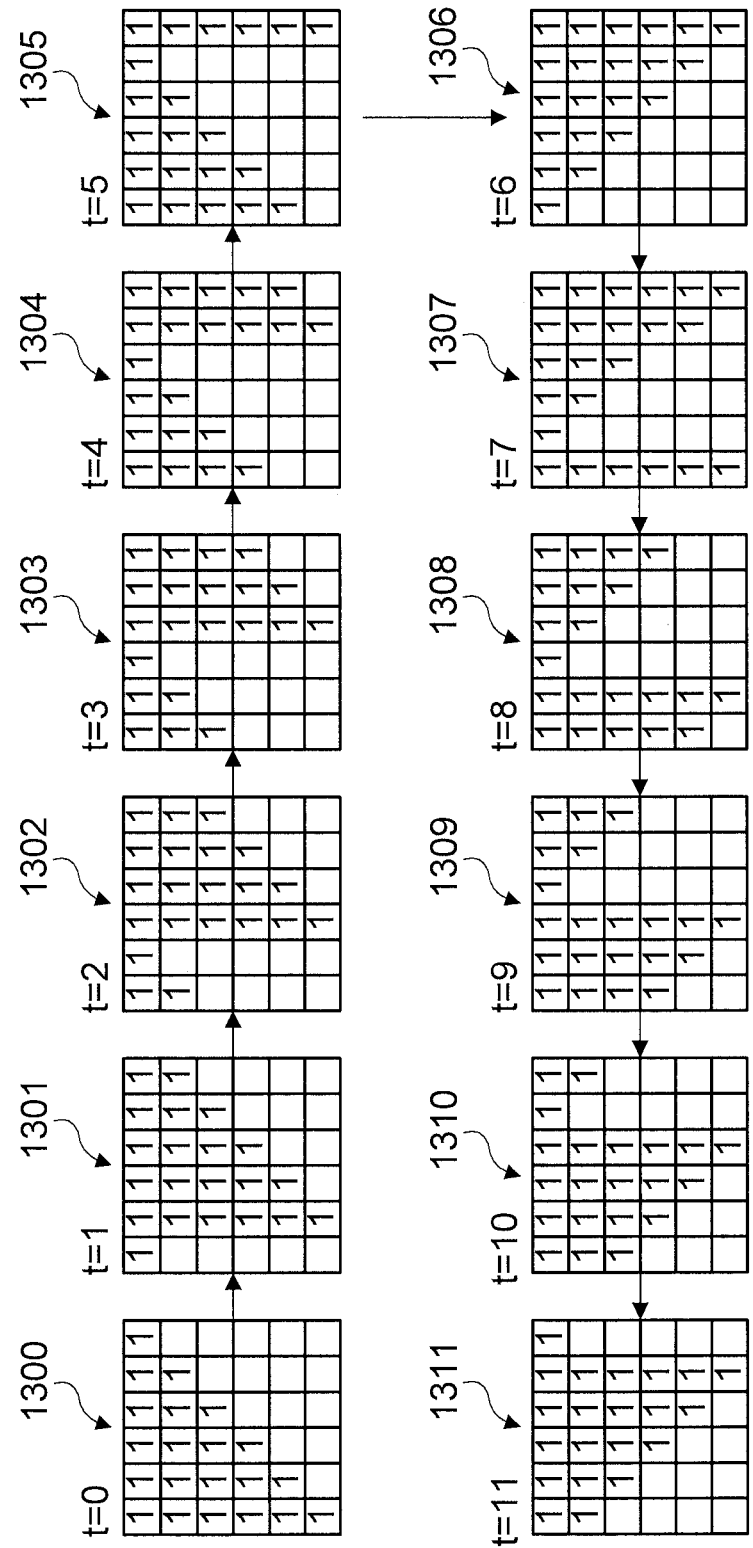
FIG. 13 is a diagram showing time transition of the priority matrix, in accordance with an embodiment of the present invention.

Referring to FIG. 13, a schematic diagram indicating time transition of the priority matrix 940P1 (940P2) is shown. In an exemplary embodiment, every time when the operation from receiving the signals REQ(1) to REQ(N) to sending the signals ACK(1) to ACK(N) is completed, the priority matrix 940P11 (940P2) is assumed to change its content. For example, time transition of the priority matrix P(i,j) may be obtained by the following formulae:

$$1 \leq i, j \leq N$$

$$t = 0 \rightarrow P(i, j) = \begin{cases} 1 & \text{if } (i+j) \leq (N+1) \\ 0 & \text{otherwise} \end{cases}$$

$$t = N \rightarrow P(i, j) = \begin{cases} 1 & \text{if } i \geq j \\ 0 & \text{otherwise} \end{cases}$$

$$t = \text{other time slot} \rightarrow \text{Rotate } P(i, j) \text{ to right as follows}$$

Note that i may represent an index indicating a request, and j may represent an index indicating a priority value. Further, t may represent a time slot.

FIG. 13 shows matrix contents 1300 to 1311 which are examples of contents of the priority matrixes 940P1 (940P2) for time slots t=0 to t=11, respectively. Also in the matrix contents 1300 to 1311, N is assumed to be 6. Note that the matrix contents 1300 to 1311 serve as one example of a plurality of states. The matrix contents 1300 to 1305 serve as one example of a first state group, and the matrix contents 1306 to 1311 serve as one example of a second state group.

The first formula of the above formulae may be a formula for obtaining the matrix content 1300 for t=0. By this calculation, the matrix content 1300 may be formed so that the priority values "6" to "1" are assigned to one of the requests #1 to #6 in this order. The priority values arranged from large to small in this way serve as one example of a plurality of priorities having a predetermined sequence. The assigning order from the request #1 to the request #6 serves as one example of a first order. That is, the matrix content 1300 serves as one example of a first state in which each of the plurality of priorities having the predetermined sequence is assigned to one of the plurality of requests in the first order.

The second formula of the above formulae may be a formula for obtaining the matrix content 1306 for t=6. By this calculation, the matrix content 1306 may be formed so that the priority values "6" to "1" are assigned to one of the requests #6 to #1 in this order. The priority values arranged from large to small in this way serve as one example of the plurality of priorities having the predetermined sequence, as described above. The assigning order from the node #6 to the node #1 serves as one example of a second order reverse to the first order. That is, the matrix content 1306 serves as one example of a second state in which each of the plurality of priorities having the predetermined sequence is assigned to one of the plurality of requests in the second order.

The third formula of the above formulae may be a formula for obtaining the matrix contents 1301 to 1305 and 1307 to 1311 for t=1 to t=5 and t=7 to t=11. The matrix contents 1301 to 1305 may be obtained successively from the matrix content 1300 by shifting each of the requests #1 to #6 by one request to the right. In this sense, the matrix contents 1301 to 1305 serve as one example of states obtained successively from the first state by shifting the one of the plurality of requests by a predetermined number of nodes in the first order. The matrix contents 1307 to 1311 may be obtained successively from the matrix content 1306 by shifting each of requests #1 to #6 by one request to the right. In this sense, the matrix contents 1307 to 1311 serve as one example of states obtained successively from the second state by shifting the one of the plurality of requests by the predetermined number of requests in the first order.

In FIG. 13, the priority matrix 940P1 (940P2) may change its content so that the content is sequentially transitioned from the matrix content 1300 to the matrix content 1311. This transition is performed so that the priority values "1" to "6" are assigned equally to each of the requests #1 to #6. This transition is performed also so that high and low relations appear equally between pairs of priority values "1" to "6" each assigned to a pair of the requests #1 to #6. For example, a priority value assigned to the request #2 is larger than a priority value assigned to the request #3 in five matrix contents of the matrix contents 1300 to 1305, and a priority value assigned to the request #3 is larger than a priority value assigned to the request #2 in one matrix content of the matrix contents 1300 to 1305. On the other hand, a priority value assigned to the request #2 is larger than a priority value assigned to the request #3 in one matrix content of the matrix contents 1306 to 1311, and a priority value assigned to the request #3 is larger than a priority value assigned to the request #2 in five matrix contents of the matrix contents 1306 to 1311. Thus, high and low relations appear equally between priority values each assigned to the requests #2 and #3.

Exemplary methods in accordance with various embodiments of the present invention will now be described with respect to FIGS. 14 and 15. In particular, FIG. 14 describes an embodiment of the present invention at a high-level, while FIG. 15 describes a more detailed embodiment of the present invention relating to the signals between the matrixes in the arbiters.

Figure 14:
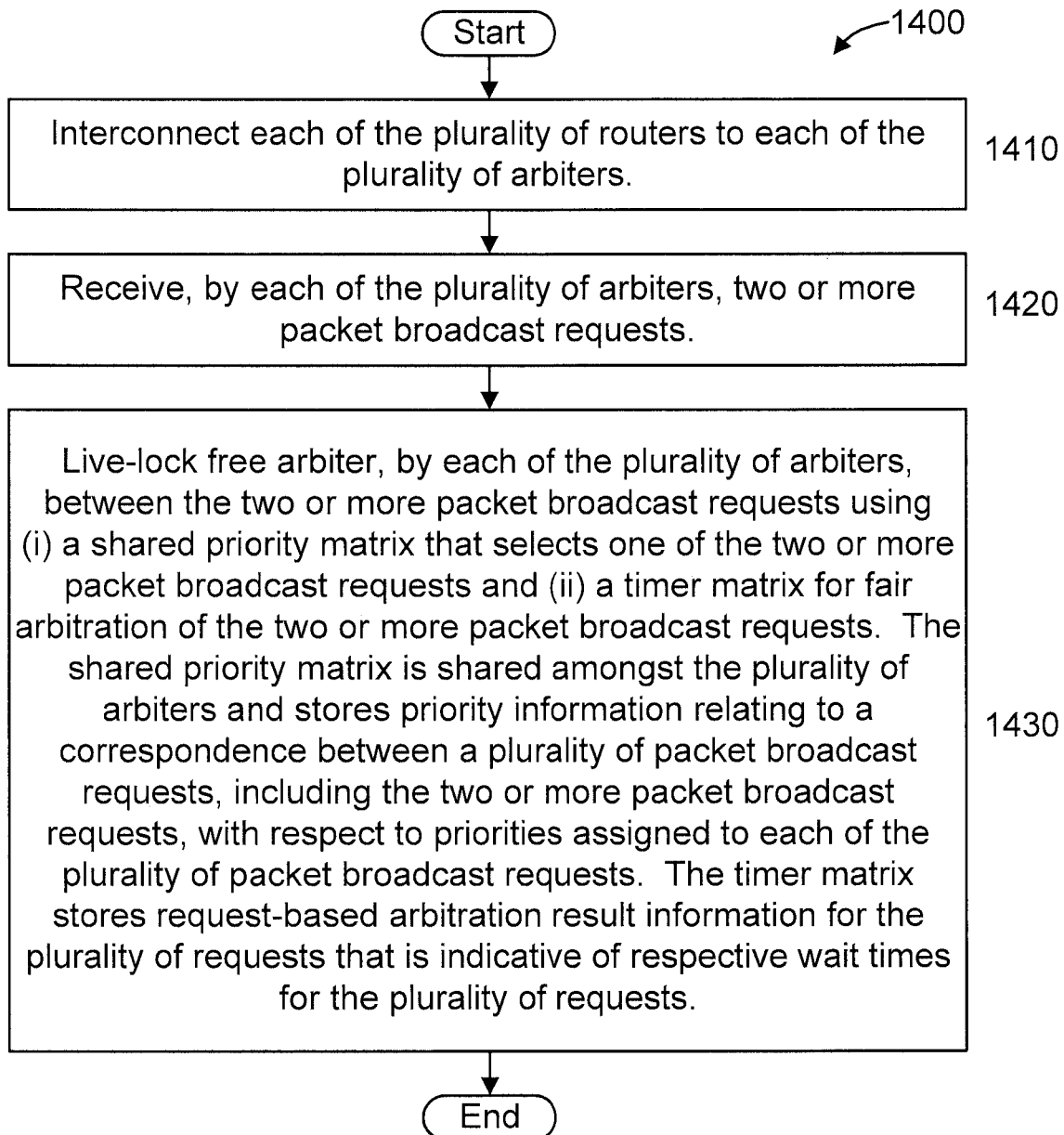
FIG. 14 is a diagram showing an exemplary method for packet broadcasting in a mesh-interconnected multi-computer network, in accordance with an embodiment of the present invention.

FIG. 14 is a diagram showing an exemplary method 1400 for packet broadcasting in a mesh-interconnected multi-computer network, in accordance with an embodiment of the present invention. The mesh-interconnected multi-computer network has a plurality of routers and a plurality of arbiters.

At step 1410, interconnect each of the plurality of routers to each of the plurality of arbiters.

At step 1420, receive, by each of the plurality of arbiters, two or more packet broadcast requests.

At step 1430, live-lock free arbiter, by each of the plurality of arbiters, between the two or more packet broadcast requests using (i) a shared priority matrix that selects one of the two or more packet broadcast requests and (ii) a timer matrix for fair arbitration of the two or more packet broadcast requests. The shared priority matrix is shared amongst the plurality of arbiters and stores priority information relating to a correspondence between a plurality of packet broadcast requests, including the two or more packet broadcast requests, with respect to priorities assigned to each of the plurality of packet broadcast requests. The timer matrix stores request-based arbitration result information for the plurality of requests that is indicative of respective wait times for the plurality of requests.

Figure 15:
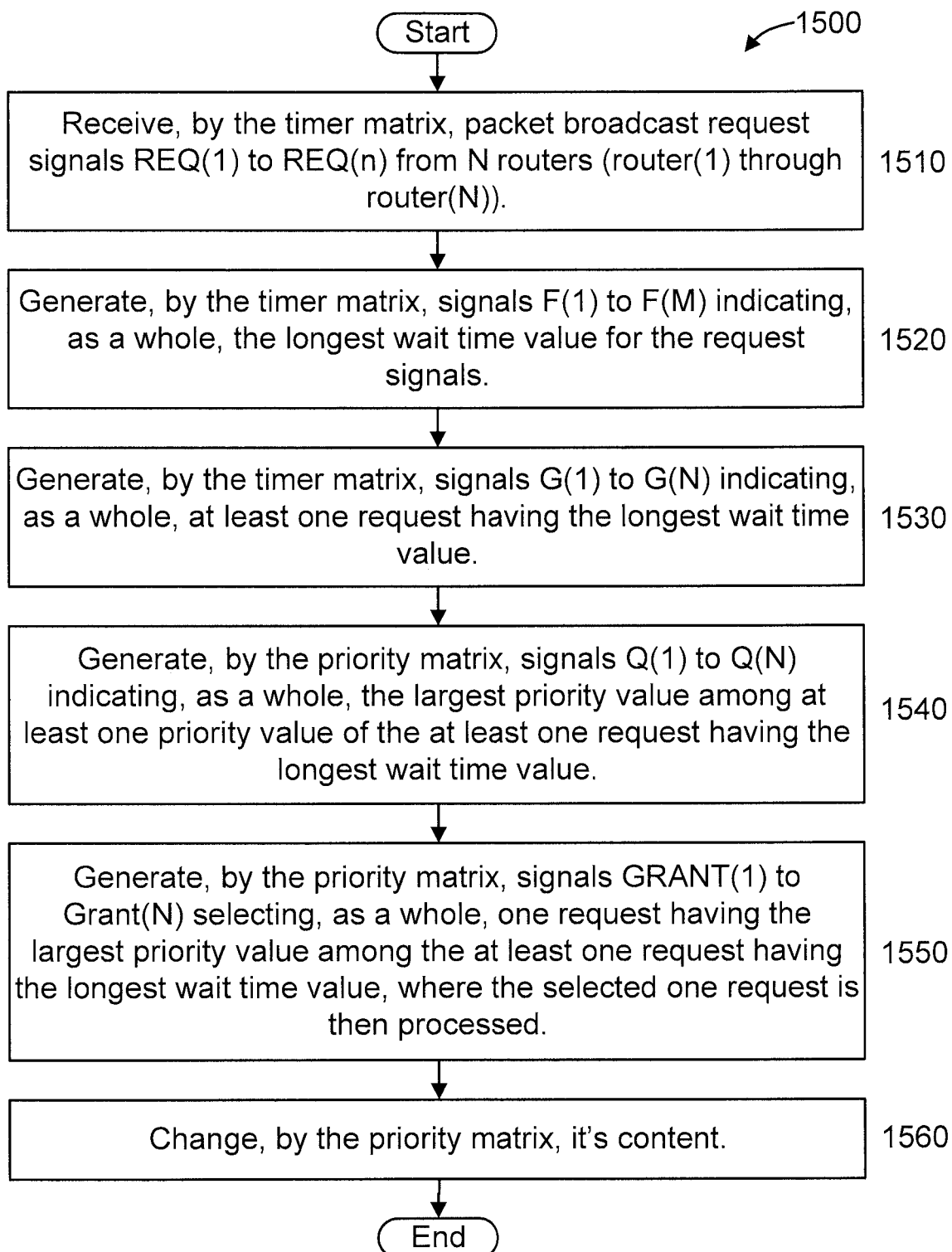
FIG. 15 is a diagram showing another exemplary method 1500 for packet broadcasting in a mesh-interconnected multi-computer network, in accordance with an embodiment of the present invention.

FIG. 15 is a diagram showing another exemplary method 1500 for packet broadcasting in a mesh-interconnected multi-computer network, in accordance with an embodiment of the present invention. The mesh-interconnected multi-computer network has a plurality of routers and a plurality of arbiters. Method 1500 can be performed by arbiter, for example, 900 of FIG. 9.

At step 1510, receive, by the timer matrix, packet broadcast request signals REQ(1) to REQ(n) from N routers (router(1) through router(N)).

At step 1520, generate, by the timer matrix, signals F(1) to F(M) indicating, as a whole, the longest wait time value for the request signals.

At step 1530, generate, by the timer matrix, signals G(1) to G(N) indicating, as a whole, at least one request having the longest wait time value.

At step 1540, generate, by the priority matrix, signals Q(1) to Q(N) indicating, as a whole, the largest priority value among at least one priority value of the at least one request having the longest wait time value.

At step 1550, generate, by the priority matrix, signals GRANT(1) to Grant(N) selecting, as a whole, one request having the largest priority value among the at least one request having the longest wait time value, where the selected one request is then processed.

At step 1560, change, by the priority matrix, it's content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for packet broadcasting in a mesh-interconnected multi-computer network having a plurality of routers and a plurality of arbiters, the computer program product comprising a non-transitory computer readable storage medium having program instructions embodied therewith, the program instructions executable by a computer to cause the computer to perform a method comprising: interconnecting each of the plurality of routers to each of the plurality of arbiters; receiving, by each of the plurality of arbiters, two or more packet broadcast requests; and live-lock free arbitering, by each of the plurality of arbiters, between the two or more packet broadcast requests using a shared priority matrix, implemented by a binary matrix, that selects one of the two or more packet broadcast requests and includes a column for each of the plurality of routers, the shared priority matrix being shared amongst the plurality of arbiters and storing priority information determined from summing the matrix column values and relating to a correspondence between a plurality of packet broadcast requests, including the two or more packet broadcast requests, with respect to priorities assigned to each of the plurality of packet broadcast requests, each of columns of the shared priority matrix corresponding to a respective one of the routers.

2. The computer program product of claim 1, wherein said live-lock free arbitering step arbiters between the two or more packet broadcast requests further using a timer matrix for fair arbitration of the two or more packet broadcast requests, wherein the timer matrix stores request-based arbitration result information for the plurality of requests that is indicative of respective wait times for the plurality of requests.

3. The computer program product of claim 1, wherein the priority matrix assigns the priorities using a scheme in which an assigned priority increases with increasing packet broadcast request processing wait time.

4. The computer program product of claim 1, wherein the correspondence changes among a plurality of states;
   the plurality of states includes a first state group and a second state group;
   the first state group includes a first state in which each of the priorities having a predetermined sequence is assigned to one of the plurality of requests in a first order; and
   the second state group includes a second state in which each of the priorities having the predetermined sequence is assigned to one of the plurality of requests in a second order reverse to the first order.

5. The computer program product of claim 4, wherein the predetermined sequence is a sequence in which the priorities are arranged from high to low.

6. The computer program product of claim 4, wherein:
   the first state group further includes states obtained successively from the first state by shifting the one of the plurality of requests by a predetermined number of requests in the first order; and
   the second state group further includes states obtained successively from the second state by shifting the one of the plurality of requests by the predetermined number of requests in the first order.

7. The computer program product of claim 6, wherein the predetermined number of requests is one.

8. The computer program product of claim 1, wherein the correspondence changes in response to selecting one of the two packet broadcast requests using the priority information.

9. The computer program product of claim 1, wherein the correspondence changes in response to an elapse of a predetermined period of time.

10. The computer program product of claim 1, wherein each of the plurality of arbiters corresponds to a respective one of a plurality of network destinations, and wherein a packet for a given one of the two or more packet broadcast requests is forwarded by corresponding ones of the plurality of routers only when a grant is received from each of the plurality of arbiters corresponding to applicable ones of the plurality of network destinations for the packet.

11. The computer program product of claim 1, wherein N is a number of the plurality of routers, and said live-lock free arbitering step selects one of the two or more packet broadcast requests to be processed within N arbitration rounds.

12. The computer program product of claim 1, wherein said live-lock free arbitering step selects whichever of the two or more packet broadcast requests has a longest waiting time and utilizes the priority matrix to assign priority that increases with increasing packet broadcast request processing wait time.

13. A system for packet broadcasting in a mesh-interconnected multi-computer network having a plurality of routers, comprising: a plurality of arbiters, interconnected to each of the plurality of routers, configured to: receive two or more packet broadcast requests; and live-lock free arbiter between the two or more packet broadcast requests using a shared priority matrix, implemented by a binary matrix, that selects one of the two or more packet broadcast requests and includes a column for each of the plurality of routers, the shared priority matrix being shared amongst the plurality of arbiters and storing priority information determined from summing the matrix column values and relating to a correspondence between a plurality of packet broadcast requests, including the two or more packet broadcast requests, with respect to priorities assigned to each of the plurality of packet broadcast requests, each of columns of the shared priority matrix corresponding to a respective one of the routers.

14. The system of claim 13, wherein the plurality of arbiters arbitrate between the two or more packet broadcast requests further using a timer matrix for fair arbitration of the two or more packet broadcast requests, wherein the timer matrix stores request-based arbitration result information for the plurality of requests that is indicative of respective wait times for the plurality of requests.

15. The system of claim 13, wherein the priority matrix assigns the priorities using a scheme in which an assigned priority increases with increasing packet broadcast request processing wait time.

16. The system of claim 13, wherein the correspondence changes among a plurality of states;
   the plurality of states includes a first state group and a second state group;
   the first state group includes a first state in which each of the priorities having a predetermined sequence is assigned to one of the plurality of requests in a first order; and
   the second state group includes a second state in which each of the priorities having the predetermined sequence is assigned to one of the plurality of requests in a second order reverse to the first order.

17. The system of claim 16, wherein the predetermined sequence is a sequence in which the priorities are arranged from high to low.

18. The system of claim 16, wherein:
   the first state group further includes states obtained successively from the first state by shifting the one of the plurality of requests by a predetermined number of requests in the first order; and
   the second state group further includes states obtained successively from the second state by shifting the one of the plurality of requests by the predetermined number of requests in the first order.

\* \* \* \* \*